UNITED STATES PATENT OFFICE.

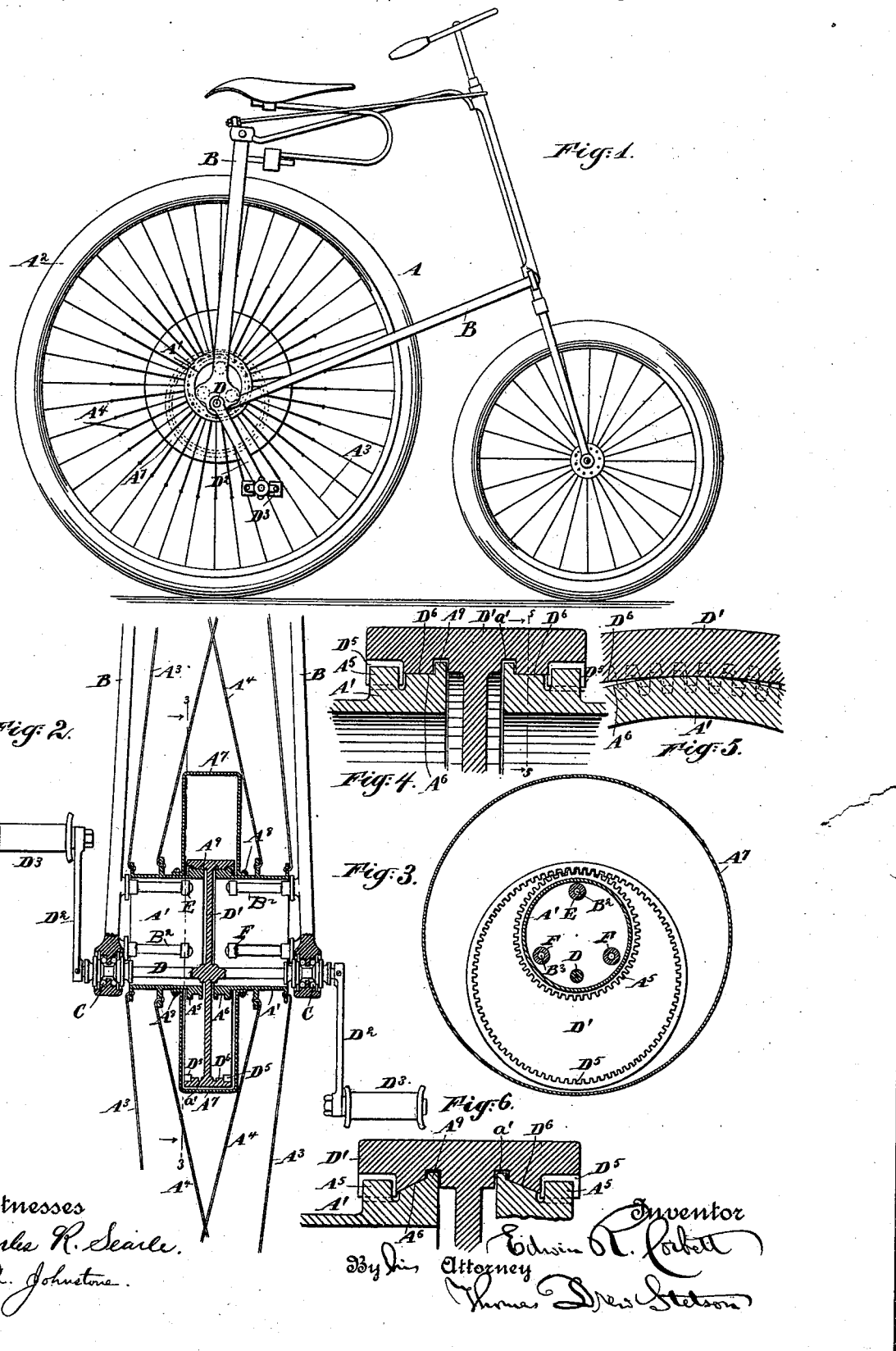

EDWIN R. CORBETT, OF NEW YORK, N. Y.

BICYCLE.

SPECIFICATION forming part of Letters Patent No. 501,056, dated July 11, 1893.

Application filed June 20, 1892. Serial No. 437,267. (No model.)

*To all whom it may concern:*

Be it known that I, EDWIN R. CORBETT, a citizen of the United States, residing in the city and county of New York, in the State of New York, have invented a certain new and useful Improvement in Velocipedes, of which the following is a specification.

I carry the load on anti-friction bearings which are formed in one with the gearing.

The accompanying drawings form a part of this specification and represent what I consider the best means of carrying out the invention.

Figure 1 is a general side elevation. Fig. 2 is a vertical transverse section of the central portion on a larger scale. Fig. 3 is a section on the line 3—3 in Fig. 2. Fig. 4 is a vertical transverse section of a portion on a still larger scale. Fig. 5 is a section on the line 5—5 in Fig. 4; and Fig. 6 is a section corresponding to Fig. 4, showing a modification.

Similar letters of reference indicate corresponding parts in all the figures where they appear.

A is the main wheel, certain parts being designated when necessary by super-numerals, as A'. The center of this wheel is formed of a large tube in two short lengths, A', A', separated by a sufficient space to allow a driving gear wheel D' of larger diameter, to turn on a shaft D, which extends across near the bottom of the interior of the tube. The tubes A' are connected to the rim $A^2$ by diagonal braces $A^3$, $A^3$, fixed to the outer ends of the tubes and by shorter diagonal braces $A^4$, $A^4$, connected at points near the mid-length of each tube, and extending obliquely across and fixed to the diagonal brace $A^3$ on the opposite side of the wheel. The arrangement of the braces gives great stiffness to the wheel.

B is the framing which may receive the weight of the rider through a saddle and elastic connections of any ordinary or suitable construction, not shown.

C are series of anti-friction balls traversing in suitable channels in the base of the frame B, and in flanges keyed or otherwise firmly set on the shaft D.

The cranks $D^2$ and treadles $D^3$ are mounted on the driving shaft, and may be of any ordinary or suitable construction to receive the action of the rider's feet and communicate it through the internally geared wheel D' to corresponding gears on the exterior of the inner edges of the short tubes A'.

The interior of the wheel D' is equipped with a series of accurately cut gear teeth on each side and also with a smoothly bored surface $D^6$ which coincides with the pitch-line of such gear. The exterior of each tube A' is equipped with corresponding external gear teeth, and also with a corresponding smoothly turned surface $A^6$ adjacent to the teeth.

The load transmitted through the framing B and driving shaft D to the driving wheel D' is supported by the rolling of the internal smoothly bored portions of the rim of the latter upon the corresponding smoothly turned surfaces near the inner ends of the tubes A'. The driving force transmitted through the cranks and the shaft D to the same wheel D', is transmitted through the internal gear teeth on the latter to the corresponding gear teeth on the tubes.

Horizontal arms $B^2$ extend from the framing B into the tubes and carry anti-friction rollers E, which, when the device is in use, stand in contact or nearly in contact with smoothly bored surfaces on the interior of the tubes. The rollers E are each of a length nearly equal to the tube A' in which it plays, and each is equipped to bear against the smoothly bored portion of the interior of the tube near each end. The extreme outer end of each wheel or roller E is flanged as shown in Fig. 2, and by engaging against the smoothly turned end of the tube A' serves to restrain the latter against excessive end-play. When the wheel is subjected to a load transmitted through the frame, the load is carried on the smooth surfaces $A^6$ $D^6$. When, on the contrary, the wheel is lifted by the frame, its weight is received on the rollers E and arms $B^2$.

$A^7$ is a circular casing in the center of the wheel A and secured by screws $A^8$ so as to be rigidly but removably fixed to each of the tubes A' near its inner end. This casing is concentric to the wheel A, and is of sufficient diameter and width to allow the internally geared driving wheel D' to play within it without touching it. This casing $A^7$ forms a stiff connection between the two tubes A' and holds them rigidly in line, and the proper distance apart under all conditions.

It will be understood that the anti-friction balls C perform their usual function of supporting the weight upon the driving shaft and also of resisting end movement of this shaft and the framing B relatively to each other, with very little friction, but there is, nevertheless, some resistance from such friction. My invention brings it upon the slow shaft operated by the treadle instead of, as usual, on a shaft of the wheel, and proportionally reduces the resistance from such friction. The rolling friction between the smooth circles $A^6$ $D^6$ is so slight as to be inappreciable. The engagement and disengagement of the teeth of the internal gear wheel $D^5$ with the spur teeth $A^5$ involves less resistance than that of the two spur gear wheels ordinarily employed.

The rollers E perform an important function in addition to that before described, in contributing to hold the wheel firmly against tilting. They hold the wheel A steadily upright in the central position within the frame B under all circumstances.

F, F, are additional rollers which may be similar in size and form to the rollers E, mounted with liberty to revolve each on an additional rigid arm $B^3$ extending from the frame B into the tubes $A'$. They serve to steady the tubes against any forward and backward displacement within the framing. These rollers F, like the main rollers E, have each a length nearly equal that of a tube $A'$. All bear only by their enlargements at each end. These rollers F, F, should be set so much within the inner faces of the tubes $A'$ that the tubes and consequently the wheel A will be allowed a little freedom to rise and sink relatively to the framing B. This allows the load to be transmitted from the framing to the wheel A solely through the driving shaft D which has a slow motion and makes proportionately less friction.

Modifications may be made in the details without departing from the principle or sacrificing the advantages of the invention. The rigid bracing afforded by the thin concentric casing $A^7$ may allow the internal braces $A^4$ to be dispensed with; or the diagonal bracing $A^3$ and $A^4$ may be so efficient that the concentric casing $A^7$ may be dispensed with. The breadth of the internal gear $D^5$ and external gear $A^5$ and of the smooth round bearing surfaces $A^6$ $D^6$ adjacent may be increased or diminished within reasonable limits. I prefer to make them about as shown. Instead of making the treads or smooth portions $A^6$ $D^6$ cylindrical, I can make them coning, as shown in Fig. 6. In such case there is less necessity for the rims $A^9$ and recesses $a'$. When the concentric casing $A^7$ is dispensed with and the tubes $A'$ are held independently in position by the diagonal braces $A^3$ $A^4$ alone, I provide a rim $A^9$ on the extreme inner end of each tube $A'$, which engages each in a corresponding but slightly deeper groove $a'$ in the interior of the rim of the wheel $D'$. This engagement locks the parts together.

I use the term velocipede to include not alone the two wheel machine shown, but also the analogous machines having three wheels or other numbers.

I claim as my invention—

1. In a bicycle, or analogous vehicle the combination with the main wheel and framing, of gear wheels and adjacent smooth rolling surfaces fixed thereto arranged substantially as shown, so as to perform the double functions of multiplying gear for the driving power and of anti-friction wheels to carry the load, all substantially as herein specified.

2. In a bicycle, or analogous vehicle the main wheel A, driving shaft D with means as the cranks $D^2$ and treadles $D^3$ for communicating a strong rotatory motion to such shaft, arranged to serve both to carry the load and to transmit the power, and tubes $A'$ and wheel $D'$ gearing $A^5$, $D^5$, and smooth circular tracks $A^6$, $D^6$, in combination with each other and with a framing B, $B^2$, $B^3$, adapted to allow the bearings of the main wheel to rise and sink freely to a small extent therein, all arranged for joint operation as herein specified.

3. In a bicycle or analogous vehicle, the wheel A, two tubes $A'$, $A'$, mounted centrally therein in line with each other with a space between them, having the smooth exterior circular tracks $A^6$ and the exterior gear $A^5$ on such tubes, in combination with the driving shaft D, and the wheel $D'$ on the latter, running in the space between such tubes and mounted eccentrically thereto, having the smooth interior circular tracks $B^6$ and the internal gears $B^5$ and with the framing B and means for steadying the position of the parts, all arranged for joint operation substantially as herein specified.

In testimony that I claim the invention above set forth I affix my signature in presence of two witnesses.

EDWIN R. CORBETT.

Witnesses:
H. A. JOHNSTONE,
M. F. BOYLE.